United States Patent
Kim et al.

(10) Patent No.: US 8,870,217 B2
(45) Date of Patent: Oct. 28, 2014

(54) AIRBAG HOUSING FOR VEHICLE AND MANUFACTURING METHOD THEREOF

(71) Applicants: Hyundai Motor Company, Seoul (KR); Kia Motors Corporation, Seoul (KR); Hyundai Mobis Co., Ltd., Seoul (KR)

(72) Inventors: Hyun Kim, Yongin-si (KR); Hong Sik Chang, Hwaseong-si (KR); Bock Cheol Lee, Suwon-si (KR); Young-Seok Kim, Yongin-si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/737,650

(22) Filed: Jan. 9, 2013

(65) Prior Publication Data

US 2014/0077479 A1 Mar. 20, 2014

(30) Foreign Application Priority Data

Sep. 19, 2012 (KR) .................. 10-2012-0104196

(51) Int. Cl.
 *B60R 21/215* (2011.01)
 *B29C 45/16* (2006.01)
 *B60R 21/2165* (2011.01)
 *B29C 45/14* (2006.01)

(52) U.S. Cl.
 CPC ........... *B60R 21/215* (2013.01); *B29C 45/1671* (2013.01); *B29C 45/1642* (2013.01); *B60R 21/2165* (2013.01); *B29C 45/14* (2013.01)
 USPC .................................................. 280/728.3

(58) Field of Classification Search
 CPC B60R 21/2165; B60R 21/205; B60R 21/215; B29C 45/1671; B29C 45/1672
 USPC ........................................................ 280/728.3
 See application file for complete search history.

(56) References Cited

U.S. PATENT DOCUMENTS

| | | | | |
|---|---|---|---|---|
| 5,096,220 A | * | 3/1992 | Nakajima | 280/728.3 |
| 5,183,615 A | * | 2/1993 | Zushi | 264/219 |
| 5,478,105 A | * | 12/1995 | Yamakawa et al. | 280/728.3 |
| 5,639,115 A | * | 6/1997 | Kelley et al. | 280/728.3 |
| 5,775,727 A | * | 7/1998 | Sun et al. | 280/728.3 |
| 5,865,461 A | * | 2/1999 | Totani et al. | 280/728.3 |
| 6,109,645 A | * | 8/2000 | Totani et al. | 280/728.3 |

(Continued)

FOREIGN PATENT DOCUMENTS

| | | |
|---|---|---|
| JP | 2003-146173 A | 5/2003 |
| KR | 10-2002-0047463 A | 6/2002 |
| KR | 10-2011-0040418 A | 4/2011 |

*Primary Examiner* — Nicole Verley

(74) *Attorney, Agent, or Firm* — Morgan, Lewis & Bockius LLP

(57) ABSTRACT

An airbag housing for a vehicle and a manufacturing method thereof may include a main body receiving an airbag configured to expand upon collision of the vehicle and an inflator expanding the airbag, and including an end being open such that expansion of the airbag spreads in one direction, and a door portion coupled with the main body at the end of the main body to form a closed space therebetween in which the airbag and the inflator may be disposed, wherein the door portion may be open by the expansion of the airbag, wherein the door portion may be formed by combining a stiffness portion with a ductile portion, a ductility of which may be higher than a ductility of the stiffness portion.

17 Claims, 7 Drawing Sheets

(56) References Cited

U.S. PATENT DOCUMENTS

| | | | |
|---|---|---|---|
| 6,152,480 A * | 11/2000 | Iwanaga | 280/728.3 |
| 6,453,535 B1 * | 9/2002 | Nicholas | 29/413 |
| 6,565,117 B2 * | 5/2003 | Kubota et al. | 280/730.2 |
| 6,595,543 B2 * | 7/2003 | Desprez | 280/728.3 |
| 6,753,057 B1 * | 6/2004 | Gardner, Jr. | 428/43 |
| 7,040,649 B2 * | 5/2006 | Totani et al. | 280/728.3 |
| 7,100,941 B2 * | 9/2006 | Riha et al. | 280/728.3 |
| 7,291,301 B2 * | 11/2007 | Cowelchuk et al. | 264/241 |
| 7,556,284 B2 * | 7/2009 | Riha et al. | 280/728.3 |
| 7,740,269 B2 * | 6/2010 | Kang | 280/728.3 |
| 7,862,071 B2 * | 1/2011 | Hou et al. | 280/728.3 |
| 7,862,072 B2 * | 1/2011 | Grems et al. | 280/728.3 |
| 7,878,528 B2 * | 2/2011 | Dorn | 280/728.3 |
| 7,891,702 B2 * | 2/2011 | Evans et al. | 280/732 |
| 7,967,330 B2 * | 6/2011 | Kong | 280/728.3 |
| 8,336,907 B2 * | 12/2012 | Nogaret et al. | 280/728.3 |
| 8,403,357 B2 * | 3/2013 | Choi | 280/728.2 |
| 8,469,393 B1 * | 6/2013 | Siewert et al. | 280/728.3 |
| 8,590,923 B2 * | 11/2013 | An | 280/728.3 |
| 2002/0050046 A1 * | 5/2002 | Nicholas | 29/428 |
| 2004/0126532 A1 * | 7/2004 | Gardner, Jr. | 428/43 |
| 2004/0164531 A1 * | 8/2004 | Riha et al. | 280/732 |
| 2005/0269804 A1 * | 12/2005 | Yamada et al. | 280/728.3 |
| 2006/0033313 A1 * | 2/2006 | Horiyama | 280/728.3 |
| 2008/0136146 A1 * | 6/2008 | Kong | 280/728.3 |
| 2012/0139214 A1 * | 6/2012 | Choi et al. | 280/728.3 |
| 2013/0134693 A1 * | 5/2013 | Tromp | 280/728.3 |

* cited by examiner

AIRBAG HOUSING FOR VEHICLE AND MANUFACTURING METHOD THEREOF

CROSS-REFERENCE TO RELATED APPLICATION

The present application claims priority to Korean Patent Application No. 10-2012-0104196 filed on Sep. 19, 2012, the entire contents of which is incorporated herein for all purposes by this reference.

BACKGROUND OF THE INVENTION

1. Field of the Invention

The present invention relates to an airbag housing for a vehicle. More particularly, the present invention relates to an airbag housing for a vehicle and a manufacturing method thereof for improving performance and reducing a cost.

2. Description of Related Art

In general, upon collision of a vehicle traveling at a speed greater than preset value, an airbag is mounted in a vehicle to protect passengers from impact.

In detail, if the collision of the vehicle is detected by a sensor, an operation gas device is exploded and the airbag instantaneously swells due to explosion gas. In this case, a time from the collision to a perfect operation of the airbag is short of about 0.05 second. Further, the airbag uses high pressure gas generated by rapid combustion of a solid or gas stored in a high pressure container. Since such an airbag has very superior occupant protection performance against the collision of the vehicle, use of the airbag has been rapidly increased.

An airbag system for mounting and operating the airbag includes an impact detecting module having a sensor, a battery, and a diagnostic device and an airbag module.

The airbag module is mounted in a steering wheel or an instrument panel. Moreover, the airbag module includes an inflator for ejecting explosion gas when receiving a signal from the sensor, an airbag inflated by the explosion gas, and an airbag housing having the airbag and the inflator therein.

The inflator may include a fuse ignited according to an operation control signal output from an electric control unit (ECU), and a gas-foaming agent generating gas as the amorce is ignited.

The airbag housing includes a housing body receiving the airbag and the inflator therein, an air door being open by swelling of the airbag, and a door rib for coupling the airbag door with the housing body.

Meanwhile, if the airbag door and the door rib are provided by a single material, it is difficult to satisfy all characteristics required in a door hinge portion requiring ductility upon open of the airbag door and the door rib for supporting the airbag and requiring rigidity. Further, when increasing the strength of the door rib, it may not be easy to assemble the door rib and the housing main body. Moreover, when the airbag door and the door rib are formed of different materials at different parts according to requested characteristics, the coupling force at the part where the different materials are coupled to each other may be lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an airbag housing for a vehicle having advantages of being partially made of different materials according to requested characteristics, and having improved performance, and a manufacturing method thereof.

In an aspect of the present invention, an airbag housing apparatus for a vehicle may include a main body receiving an airbag configured to expand upon collision of the vehicle and an inflator expanding the airbag, and including an end being open such that expansion of the airbag spreads in one direction, and a door portion coupled with the main body at the end of the main body to form a closed space therebetween in which the airbag and the inflator are disposed, wherein the door portion is open by the expansion of the airbag, wherein the door portion is formed by combining a stiffness portion with a ductile portion, a ductility of which is higher than a ductility of the stiffness portion.

An airbag door is formed by combination of the stiffness portion with the ductile portion, wherein a fabric of a fabric material is disposed through the stiffness portion and the ductile portion of the airbag door so that a combining force of the stiffness portion and the ductile portion of the airbag door is increased.

The main body further may include a fixing member and a coupling member, wherein the fixing member is provided inside the main body to fix the airbag to the main body, and wherein the coupling member is provided outside the main body to be coupled with the fixing member.

The fabric may have a net shape getting tangled in a form of a lattice.

A plurality of peeling prevention holes having a preset size to prevent peeling of the fabric is formed in a part of the fabric to which a tension force is applied by opening of the airbag door.

The fabric is inserted into the airbag door, wherein a fabric exposure hole is formed in a boundary portion in which the stiffness portion and the ductile portion of the airbag door are combined with each other so that the fabric is viewed from an outside.

The door portion may include a support portion coupled with a circumference of the end of the main body while enclosing the circumference of the end of the main body and serving as a pillar of the door portion, and a housing roof closing an upper side of the support portion, wherein the airbag door is provided at the housing roof.

The airbag door may include both ends, wherein one of the both ends in the airbag door is separated from the housing roof while the airbag door rotates based on the other end of the both ends and is open so that the airbag is expanded and spreads outward.

The one end of the airbag door is the stiffness portion and the other end of the airbag door is the ductile portion, based on a boundary portion in which the stiffness portion and the ductile portion are combined with each other.

A hook is provided at a circumference of the end of the main body, wherein a hook locking hole is formed in the support portion and the hook is locked with the hook locking hole, and wherein the circumference of the end of the main body is inserted into an inner side of the support portion by elastic transformation of the support portion of a ductile portion side.

A slit is formed at the support portion of the ductile portion side so that the elastic transformation of the support portion is performed.

The door portion including the support portion, the housing roof, and the airbag door is integrally formed.

The door portion is provided by injection-molding which injects a stiff material forming the stiffness portion and a ductile material forming the ductile portion inside a mold.

The stiff material is combined with the ductile material by simultaneous injection of the stiff material and the ductile material.

The stiff material and the ductile material are injected into the mold in a state that a fabric of a fabric material is disposed over formation parts of the stiffness portion and the ductile portion of the airbag door.

A jig pin for temporarily fixing the fabric is provided in the mold so that the fabric is prevented from being pulled by injection of the stiff material and the ductile material.

A method of manufacturing an airbag housing apparatus for the vehicle for injection-molding the door portion may include preparing a ductile material and a stiff material constituting the door portion and a mold, inserting a fabric of a fabric material into the mold, and simultaneously injecting the ductile material and the stiff material into the mold.

The method may include fixing the fabric to the mold, and releasing the fixing of the fabric.

The fabric is fixed by a jig pin, and the jig pin is pulled outward by the injected ductile material and stiff material to release the fixing of the fabric.

According to another aspect of the present invention, there is provided a method of manufacturing an airbag housing for a vehicle for injection-molding the door portion, the method including: preparing a ductile material and a stiff material constituting the door portion and a mold; inserting a fabric of a fabric material into the mold; and simultaneously injecting the ductile material and the stiff material into the mold.

The method may further include: fixing the fabric to the mold; and releasing the fixing of the fabric. The fabric may be fixed by a jig pin, and the jig pin may be pulled outward by the injected ductile material and stiff material to release the fixing of the fabric.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
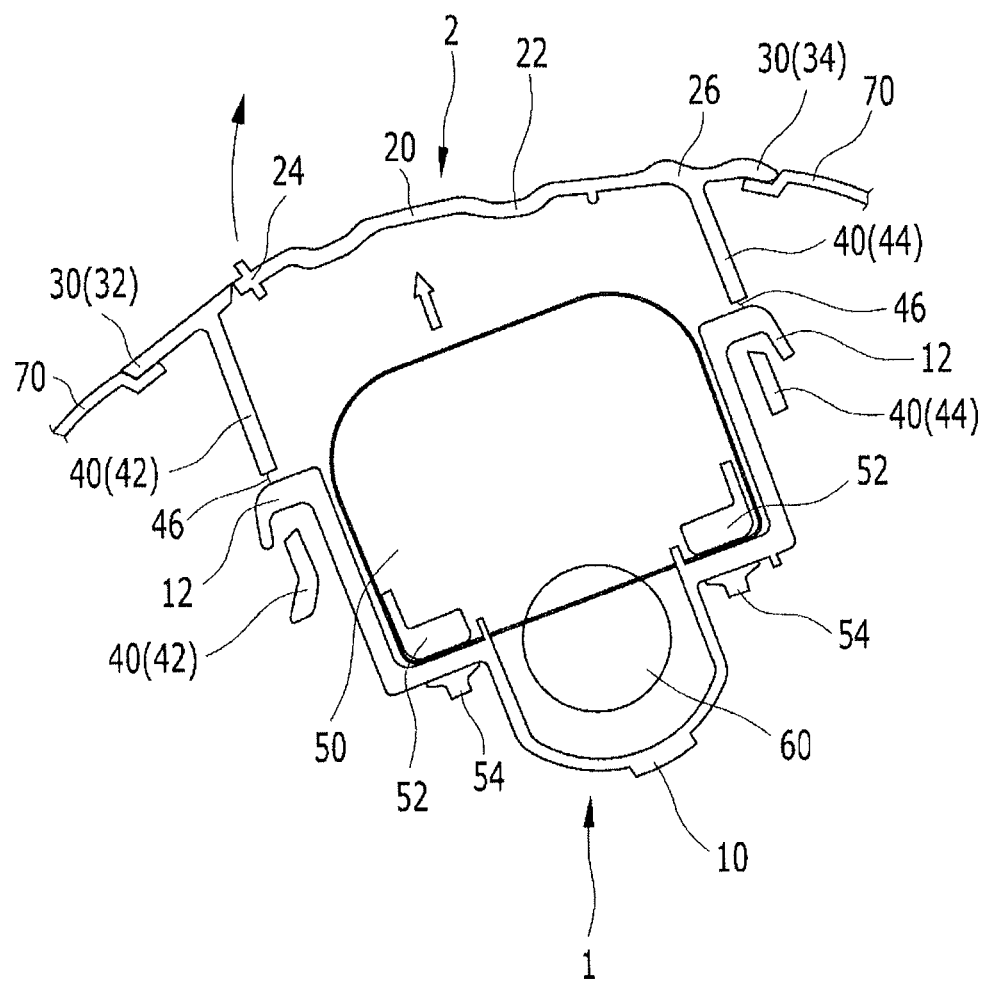
FIG. 1 is a cross-sectional view illustrating an airbag housing for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a cross-sectional view illustrating an airbag housing for a vehicle according to an exemplary embodiment of the present invention.

As shown in FIG. 1, an airbag housing for a vehicle according to an exemplary embodiment of the present invention is mounted in an instrument panel 70 and includes a main body 1 and a door portion 2.

The main body 1 is a body of the airbag housing for enclosing an airbag 50 and an inflator 60, and has a bucket shape whose side is open. That is, the airbag 50 and the inflator 60 are provided inside the main body 1. Meanwhile, a shape of the main body 1 having the bucket shape may be variously modified, such as a cylindrical shape or a square bucket shape, by a person of an ordinary skill in the art.

The main body 1 includes an inflator receiving portion 10 and a hook 12.

The inflator receiving portion 10 is provided at an opposite side of the main body 1. Further, the inflator 60 is provided inside the inflator receiving portion 10. Moreover, the inflator receiving portion 10 has a bucket shape whose surface is open to receive the inflator 60. That is, the inflator receiving portion 10 may have a bucket shape protruding from the opposite surface of the main body 1 to an opposite direction of the one surface of the main body 1. Meanwhile, the shape of the inflator receiving portion 10 having the bucket shape may be variously modified, for example, be modified to a cylindrical shape or a square bucket shape by a person of an ordinary skill in the art.

The hook 12 is provided at a circumference of an open surface of the main body 1 to couple the main body 1 with the door portion 2. Further, a plurality of hooks 12 may be provided, and the number of the hooks may be changed by an intention of a person of an ordinary skill in the art. Furthermore, the hook 12 may protrude outward from the circumference of the open surface of the main body 1. FIG. 1 shows the hook 12 protruding to both sides of an open surface of the main body 1, but the exemplary embodiment is not limited thereto.

Upon an operation of the inflator 60, the airbag 50 is expanded and spreads through the open surface of the main body 1, and the inflator 60 may inject gas in the airbag 50. That is, the airbag 50 is partially connected to the inflator 60 to receive gas from the inflator 60. Further, the inflator 60 is disposed to expand the airbag 50 by erupting the gas to the open surface of the main body 1. Moreover, the airbag 50 and the inflator 60 operate upon collision of the vehicle. Configurations and operations of the airbag 50 and the inflator 60 are apparent to a person of an ordinary skill in the art, and thus the detailed description thereof is appropriately omitted.

The main body 1 further includes a fixing member 52 and a coupling member 54.

The fixing member 52 is provided inside the main body 1 to fix the airbag 50. In addition, the fixing member 52 prevents the airbag 50 from being separated from the main body 1 upon expansion of the airbag 50.

The coupling member 54 is provided outside the main body 1 to be coupled with the fixing member 52. Further, the coupling member 54 may be a bolt, and a nut portion may be provided at the fixing member 52 to be coupled with the coupling member 54. Moreover, the fixing member 52 is disposed inside the airbag 50, and the coupling member 54 is coupled with the fixing member 52 through a part of the main body 1 and a part of the airbag 50.

Meanwhile, the main body 1 of the airbag housing for the vehicle according to an exemplary embodiment of the present invention may be made of metal.

The door portion 2 has a bucket shape whose bottom surface is open. Further, the open surface of the door portion 2 has a shape corresponding to the open surface of the main body 1 so that the door portion 2 is coupled with the main body 1 while enclosing the main body 1.

The door portion 2 includes an airbag door 20, a housing roof 30, and a support portion 40.

The airbag door 20 is provided at an opposite closed surface of the door portion 2. Moreover, the airbag door 20 is open by expansion of the airbag 50.

The airbag door 20 includes a separator 24 and a hinge portion 26. Here, the separator 24 is separated from an opposite surface of the door portion 2 by expansion of the airbag 50, and the hinge portion 26 serves as a hinge axis of the airbag door 20 which is open according to hinge motion.

Opening of the airbag door 20 will be described in detail. If the airbag door 20 is pushed to an outer side of the airbag housing by expansion of the airbag 50, the separator 24 is separated from the opposite surface of the door portion 2. Further, according to the separation of the separator 24, when the opposite surface of the door portion 2 is cut to the vicinity of the hinge portion 26, the airbag door 20 is open so that the airbag 50 is expanded and spreads to the outside. An expanded and spreading direction of the airbag 50 and an open direction of the airbag door 20 according to hinge motion are shown in FIG. 1 by arrows, respectively.

The housing roof 30 is provided at an opposite closed surface of the door portion 2. That is, the housing roof 30 functions as a roof of the airbag housing together with the airbag door 20. Further, the housing roof 30 is formed along a circumference of the airbag door 20. Moreover, the housing roof 30 extends to horizontally protrude outward from the door portion 2. Meanwhile, the housing roof 30 protruding outward is coupled with the instrument panel 70. That is, the airbag housing is mounted in the instrument panel 70 by coupling the housing roof 30 with the instrument panel 70.

The support part 40 is a side of the door portion 2 having a bucket shape, which functions as a support of the door portion 2. That is, the door portion 2 has a shape where an opposite surface of the door portion 2 closes an upper side of the support portion 40 which has a hollow pillar shape whose both surfaces are open. Moreover, a hook locking hole 46 is formed at the support portion 40 to be locked with the hook 12. In addition, the hook locking hole 46 passes through the support portion 40 so that the hook 12 may be locked therein. Meanwhile, the number of the hook locking holes 46 may be changed according to the number of the hooks 12.

Here, the housing roof 30 extends from the support portion 40 outward so that a part coupled with the instrument panel 70 is ensured.

An open surface of the main body 1 is inserted through a bottom open surface of the door portion 2, and the door portion 2 is coupled with the main body 1, thereby forming a closed space in which the airbag 50 and the inflator 60 are disposed. The airbag 50 is expanded in the closed space such that the airbag door 20 is open.

Meanwhile, the door portion 2 is made of a plastic material. Furthermore, a part including a separator 24 of the airbag door 20 in the door portion 2 is made a plastic material (hereinafter referred to as 'stiff material') having high stiffness, and a part having a hinge portion 26 is made of a plastic material (hereinafter referred to as 'ductile material'). That is, the door portion 2 may be made of two plastic materials of different properties. Here, the stiff material may be a complex of polypropylene (PP) and glass fiber (GF), and the ductile material may be thermoplastic ethylene hydrocarbon (TPO: olefine).

The PP is a representative thermoplastic resin, which represents superior tensile strength, impact strength, surface strength, and heat resistance. In addition, the GF synthesizes with a resin to form glass fiber reinforced plastics (GFRP). If a temperature is increased in the GFRP, it is polymerized and cured, which becomes a thermosetting resin. Accordingly, a complex of the PP and the GF becomes a material which is robust and hard in most temperatures. Moreover, the TPO has superior elongation at a low temperature and assembling property at a room temperature. The components and materials are apparent to a person of an ordinary skill in the art, and thus the detailed description thereof is omitted. Meanwhile, according to an exemplary embodiment of the present invention, a synthetic ratio of the PP and the GF may be 7:3 in the complex of the PP and the GF, but the exemplary embodiment is not limited thereto.

The airbag door 20, the housing roof, 30 and the support port 40 may be integrally injection-molded. Meanwhile, the injection molding is a processing method of injecting a molten plastic material in a mold, and solidifying and curing the melted plastic material to make a mold product and is apparent to a person of an ordinary skill in the art, and thus the detailed description thereof is omitted.

Figure 2:
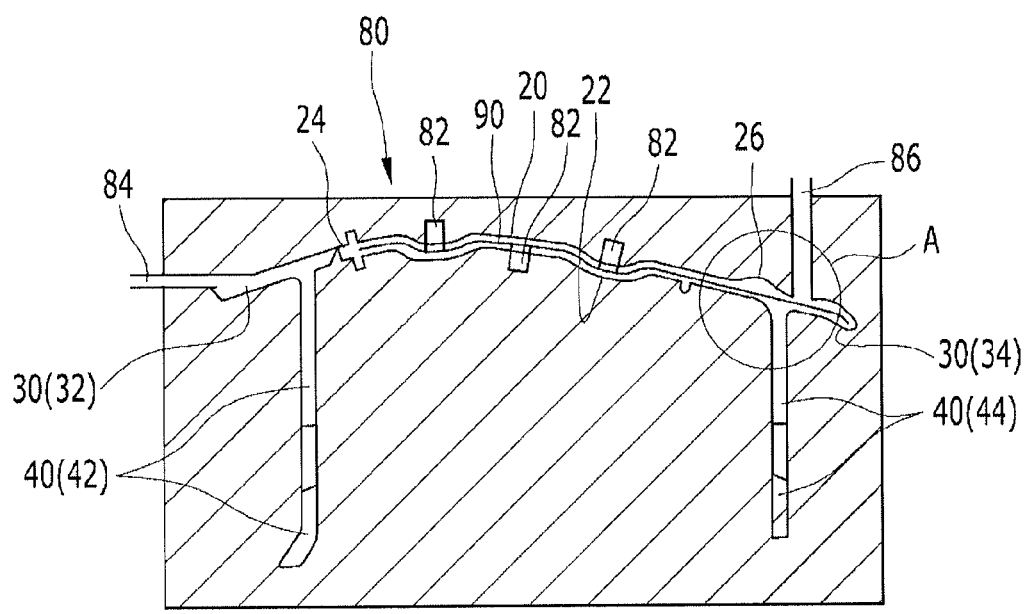
FIG. 2 is a cross-sectional view illustrating a mold for manufacturing a door portion of an airbag housing for a vehicle according to an exemplary embodiment of the present invention.

FIG. 2 is a cross-sectional view illustrating a mold for manufacturing a door portion of an airbag housing for a vehicle according to an exemplary embodiment of the present invention.

As shown in FIG. 2, an inside of a mold 80 for manufacturing the door portion 2 of the airbag housing is formed as a space having a shape corresponding to a shape of the door portion 2. Further, the same reference numerals as in the door portion 2 shown in FIG. 1 are given to the mold 80 in FIG. 2, corresponding to the parts of the door portion 2 to be formed by the mold 80.

The mold 80 includes a first injection port 84, a second injection port 86, and a jig pin 82.

The first injection port 84 is formed so that the stiff material is injected into the mold 80. Further, the second injection port 86 is formed so that the ductile material is injected into the mold 80. In addition, the stiff material and the ductile material are simultaneously injected into the mold 80, so that the stiff material and the ductile material are combined with each other to form the door portion 2.

Referring to FIGS. 1 and 2, the door portion 2 further includes a boundary portion 22 and a fabric 90.

The boundary portion 22 is a part with which the stiff material and the ductile material are combined. That is, the boundary portion 22 becomes a boundary between the stiff material and the ductile material. Moreover, the airbag door 20 is divided into two parts based on the boundary portion 22.

The door portion 2 has the stiff material in the separator 24 side of the airbag door 20, and has a ductile material in the hinge portion 26 side of the airbag door 20, based on the boundary portion 22. That is, an end of the separator 24 side of the door portion 2 communicates with the first injection port 84, and an end of the hinge portion 26 side of the door portion 2 communicates with the second injection port 86, inside the mold 80. Here, the housing roof 30 is divided into a stiff roof 32 formed by the stiff material and a ductile roof 34 formed by the ductile material, and the support portion 40 is divided into a stiff support 42 formed by the stiff material and a ductile support 44 formed by the ductile material.

Meanwhile, a combining force between the stiff material and the ductile material must be considered in the boundary portion 22. That is, if the combining force between the stiff material and the ductile material is weak, the boundary portion 22 may be cracked and the air back door 20 may be damaged upon open of the air back door 20. Accordingly, to improve the combining force between the stiff material and the ductile material combined with each other in the boundary portion 22, the fabric 90 of a fabric material is inserted into the airbag door 20.

The fabric 90 is disposed inside the mold 80 before injecting the stiff material and the ductile material. Further, the fabric 90 is disposed in a space in which the airbag door 20 is formed inside the mold 80. Moreover, the fabric 90 may be disposed between the separator 24 of the airbag door 20 and the hinge portion 26 or from the separator 24 beyond the hinge 26.

When the stiff material and the ductile material are injected in the mold 80, the jig pin 82 fixes the fabric 90. That is, the jig pin 82 prevents the fabric 90 from being crumpled or biased to one side due to injection of the stiff material and the ductile material. Further, the jig pin 82 is pushed to an outer side inside the mold 80 by the injected stiff material and ductile material, so that fixing of the fabric 90 is released.

Figure 3:
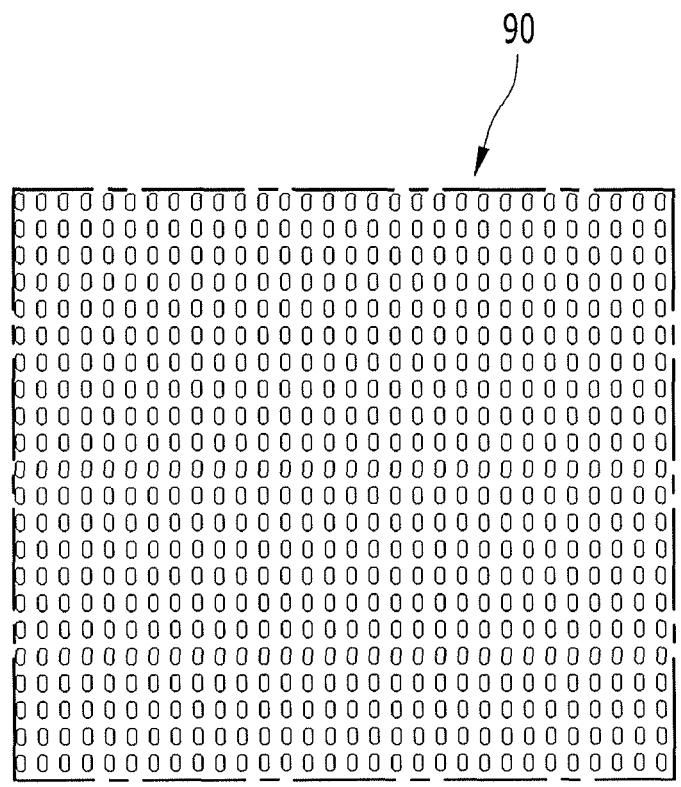
FIG. 3 is a plan view illustrating a fabric according to an exemplary embodiment of the present invention.

FIG. 3 is a plan view illustrating a fabric according to an exemplary embodiment of the present invention.

As shown in FIG. 3, the fabric 90 has a net shape in which a fabric material gets tangled in the form of a lattice.

As the fabric 90 has the net shape, the injected stiff material and ductile material pass through a mesh of the fabric 90 so the door portion 2 may be easily formed. Moreover, the door portion 2 is formed by passing the stiff material and the ductile material through the mesh of the fabric 90, so the fabric 90 may be firmly combined with the stiff material and the ductile material.

Figure 4:
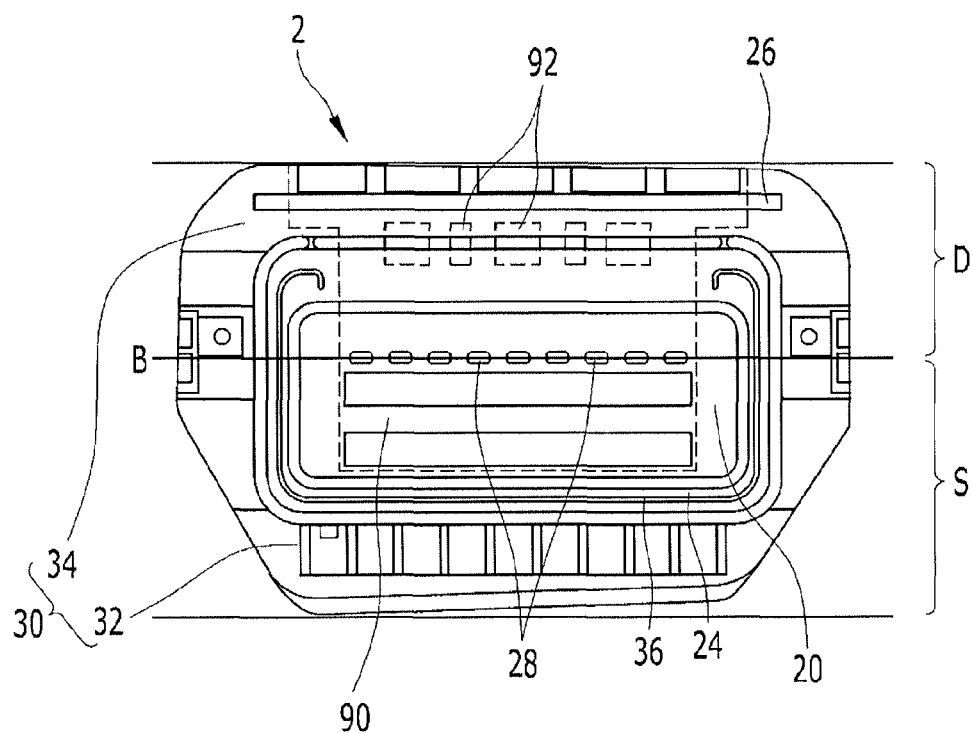
FIG. 4 is a plan view illustrating a door portion according to an exemplary embodiment of the present invention.

FIG. 4 is a plan view illustrating a door portion according to an exemplary embodiment of the present invention. Further, FIG. 4 is a view illustrating the door portion 2 viewed from an upper side of the housing roof 30.

As shown in FIG. 4, the door portion 2 further includes a tear line 36 and a fabric exposure hole 28. Moreover, FIG. 4 illustrates the door portion 2 which is divided into a stiff portion S formed by a stiff material and a ductile portion D formed by a ductile material based on a boundary line B passing through the boundary portion 22. In addition, the fabric 90 further includes a peeling prevention hole 92.

The tear line 36 is formed for easy open of the airbag door 20. Further, the tear line 36 is formed at a boundary between the airbag door 20 and the housing roof 30 along a circumference of the airbag door 20. That is, the airbag door 20 is open as an opposite surface of the door portion 2 is cut along the tear line 36. Further, a thickness of a formation part of the tear line 36 of the door portion 2 is thinner than that of other parts.

As described above, the housing roof 30 is formed at a circumference of the airbag door 20. Further, the airbag door 20 may have a rectangular shape taking the hinge portion 26 as one side and the separator 24 as a side opposite to the one side. Moreover, the tear line 36 is formed along a circumference of the airbag door 20, and the tear line 36 may have a U-shape in which a side of the hinge portion 26 is open. However, the shape of the airbag door 20 and the shape of the tear line 36 corresponding to the shape of the airbag door 20 may be easily modified by a person of an ordinary skill in the art.

Upon opening of the airbag door 20, a boundary between the separator 24 of the airbag door 20 and the housing roof 30 is firstly cut so that the separator 24 is separated from the opposite surface of the door portion 2. Moreover, the airbag door 20 performs hinge motion based on the hinge portion 26 simultaneously with cutting processing along the tear line 36.

Figure 6:
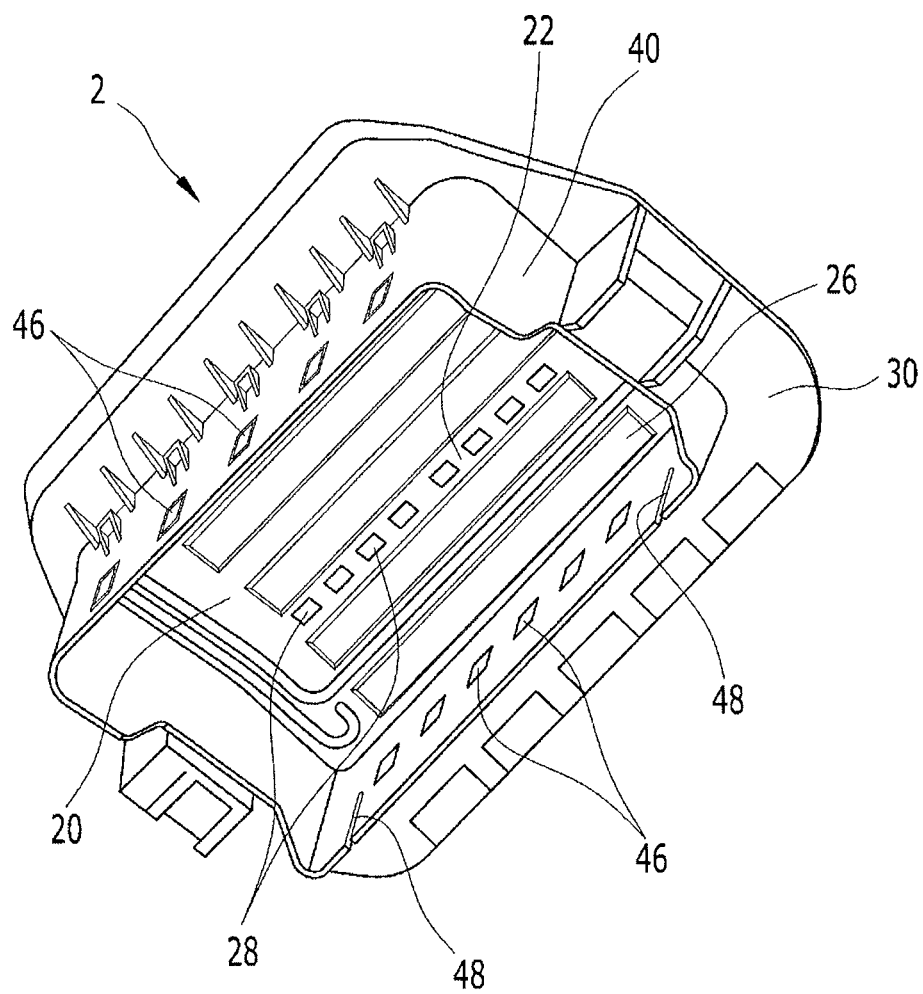
FIG. 6 is a view illustrating a door portion viewed from a lower side according to an exemplary embodiment of the present invention.

The fabric exposure hole 28 is formed such that the fabric 90 inserted into the airbag door 20 is viewed outward. Further, a plurality of fabric exposure holes 28 are formed along a boundary line B passing through a boundary portion 22. Moreover, a size and an interval of the fabric exposure hole 28 are set such that a coupling force between the stiff material and the ductile material in the boundary portion 22 is not lowered. Referring to FIG. 6, the fabric exposure hole 28 may be formed at a bottom surface of the airbag door 20 so that the fabric 90 may be confirmed in a lower side of the door portion 2.

FIG. 4 shows the fabric 90 disposed from an end of the stiff roof 32 formed at the stiffness portion S to a vicinity of the separator 24 of the airbag door 20. That is, the fabric 90 is disposed, passing through the hinge port 26 and the boundary portion 22 of the airbag door 20.

Referring to FIG. 2, "A" indicates a location in which the fabric 90 may be peeled. Further, the ductile material injected into the second injection port 86 is distributed to the housing roof 30 side and the ductile support 44 side and supplied. In this case, according to flow of the ductile material distributed to the housing roof 30 side and the ductile support 44 side, a fabric 90 of the location "A" is tightly pulled so that the door portion 2 is formed. In addition, upon open of the airbag door 20, a tension force is applied to the fabric 90 of the location "A" adjacent to the hinge portion 26 of the airbag door 20. Accordingly, the tightly pulled fabric 90 may be peeled by the tension.

The peeling prevention hole 92 passes through the fabric 90 so that peeling of the fabric 90 is prevented upon open of the airbag door 20. Further, a plurality of peeling prevention holes 92 are formed at the location "A" of the fabric 90. Moreover, the peeling prevention holes 92 are formed at predetermined intervals to have predetermined size.

The peeling prevention hole 92 may have the predetermined size to prevent the fabric 90 of the location "A" from being tightly pulled due to the flow of the ductile material. Further, as the peeling prevention holes 92 are formed at predetermined intervals, the fabric 90 of the location "A" may have elastic force higher than that of other part of the fabric. Accordingly, peeling of the fabric due to open of the airbag door 20 is prevented.

Figure 5:
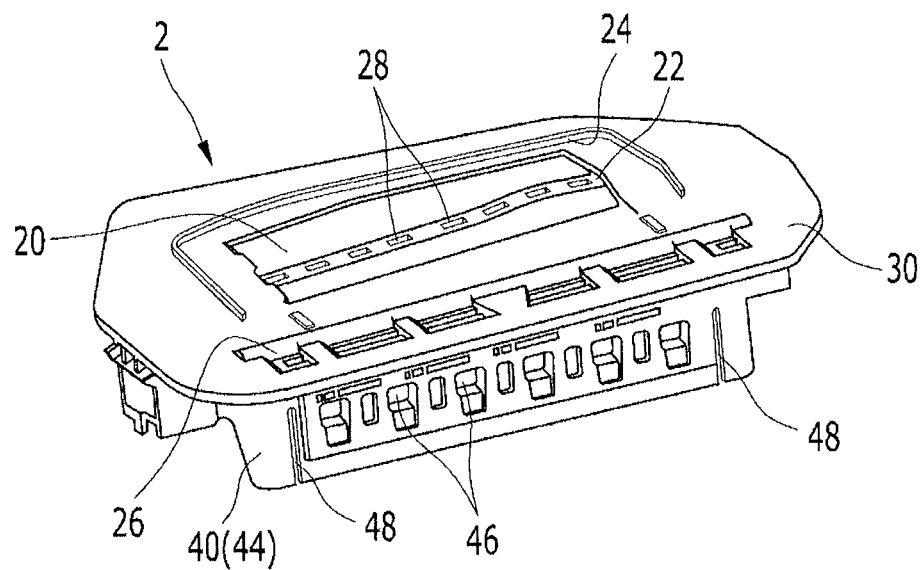
FIG. 5 is a perspective view illustrating a door portion according to an exemplary embodiment of the present invention.

FIG. 5 is a perspective view illustrating a door portion according to an exemplary embodiment of the present invention, and FIG. 6 is a view illustrating a door portion viewed from a lower side according to an exemplary embodiment of the present invention.

As shown in FIGS. 5 and 6, the door portion 2 further includes a slit 48.

The slit 48 is formed to easily couple the door portion 2 with the main body 1. Further, the slit 48 is formed at the ductile support 44. Further, the slit 48 is arranged adjacent to a plurality of hook locking holes 46 which are formed at the ductile support 44. That is, the slit 48 passes through the ductile support 44 in the same direction as that of the hook locking hole 46. Meanwhile, at least two slits 48 are formed. Although two slits 48 are shown in FIGS. 5 and 6, the exemplary embodiment is not limited thereto.

Referring to the description of FIG. 1, an open surface of the main body 1 is inserted through a bottom open surface of the door portion 2 and the hook 12 is locked in the hook locking hole 46 so that the door 2 is coupled with the main body 1. In this case, the ductile support 44 between the slit 48 and the slit 48 is elastically transformed to be pulled outward, so that a circumference of the open side of the main body 1 in which the hook 12 is formed may be easily inserted through a bottom open surface of the door portion 2. Further, the elastically transformed ductile support 44 returns to an original location simultaneously with locking the hook 12 with the hook locking hole 46.

Meanwhile, a thickness of a formation part of the slit 48 is relatively thin so that the ductile support 44 is easily and elastically transformed. In the meantime, upon of expansion of the airbag 50, to prevent the ductile support 44 between the slit 48 and the slit 48 from being damaged, the thickness of the formation part of the hook locking hole 46 is relatively thick. Here, the thickness of the formation part of the hook locking hole 46 may be set to 5.5 mm or greater.

Hereinafter, a method of manufacturing an airbag housing for a vehicle according to an exemplary embodiment of the present invention will be described with reference to FIG. 7.

Figure 7:
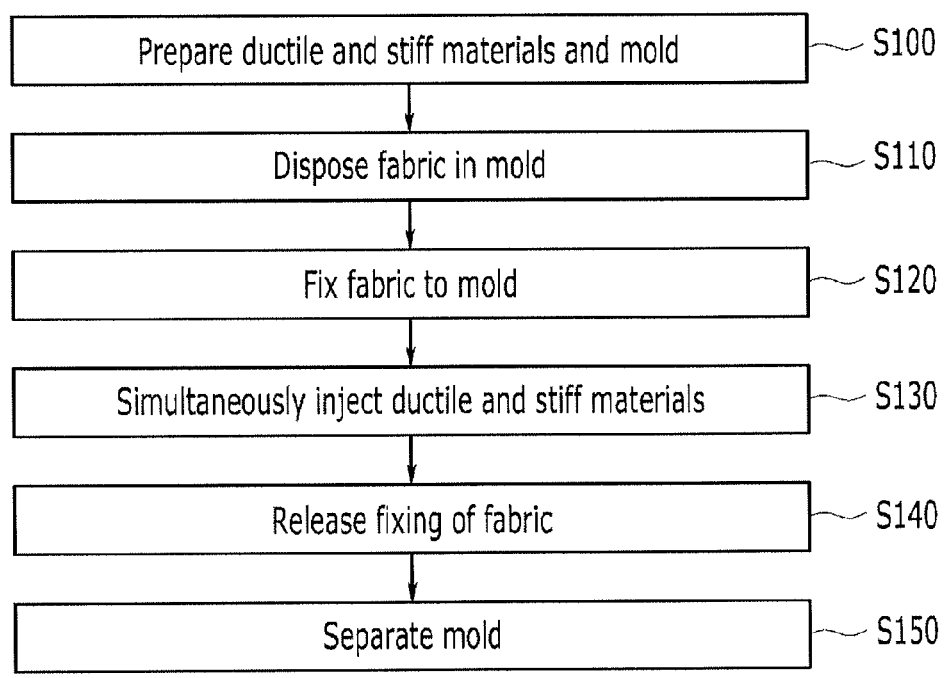
FIG. 7 is a flowchart illustrating the method of manufacturing an airbag housing for a vehicle according to an exemplary embodiment of the present invention.

FIG. 7 is a flowchart illustrating the method of manufacturing an airbag housing for a vehicle according to an exemplary embodiment of the present invention. Further, the method of manufacturing an airbag housing for a vehicle according to an exemplary embodiment of the present invention is a method of manufacturing an airbag housing for a vehicle for injection-molding the door portion 2. As described above, manufacture of the door portion 2 is performed by injection-molding.

As shown in FIG. 7, if the ductile material, the stiff material, and the mold 80 forming the door portion 2 are prepared (S100), the fabric 90 of a fabric material is disposed inside the mold 80 (S110). Meanwhile, the fabric 90 may be disposed in various schemes by a person of an ordinary skill in the art.

If the disposal of the fabric 90 is completed (S110), the jig pin 8 fixes the fabric 90 to the mold 80 (S120). In this case, the jig pin 82 is disposed so that the fabric 90 is temporarily fixed, and fixing of the fabric 90 is released as the injection-molding proceeds.

If fixing of the fabric 90 is completed (S120), the ductile material and the stiff material are simultaneously injected in the mold 80 (S130). Here, as the ductile material and the stiff material are simultaneously injected, the ductile material and the stiff material are combined with each other inside the mold 80. Further, by the injection of the ductile material and the stiff material, the jig pin 82 is pulled from an inside of the mold 80 outward so that fixing of the fabric 90 is released (S140).

If the injection of the ductile material and the stiff material is completed (S130), the mold 80 is separated from the formed door portion 2 (S150).

As described above, according to an exemplary embodiment of the present invention, the airbag housing for the vehicle is formed by different materials at different parts so that requested characteristics by parts may be satisfied. Further, a coupling force of a boundary portion 22 of different materials may be increased by inserting a fabric material into the mold 80. Further, the door portion 2 and the main body 1 may be easily assembled by forming the slit 48 in the support portion 40.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag housing apparatus for a vehicle comprising:
    a main body receiving an airbag configured to expand upon collision of the vehicle and an inflator expanding the airbag, and including an end being open such that expansion of the airbag spreads in one direction; and
    a door portion coupled with the main body at the end of the main body to form a closed space therebetween in which the airbag and the inflator are disposed, wherein the door portion is open by the expansion of the airbag;
    wherein the door portion is formed by combining a stiffness portion with a ductile portion a ductility of which is higher than a ductility of the stiffness portion;
    wherein an airbag door is formed by combination of the stiffness portion with the ductile portion;
    wherein a fabric of a fabric material is disposed through the stiffness portion and the ductile portion of the airbag door so that a combining force of the stiffness portion and the ductile portion of the airbag door is increased;
    wherein the fabric is inserted into the airbag door; and
    wherein a fabric exposure hole is formed in a boundary portion in which the stiffness portion and the ductile portion of the airbag door are combined with each other so that the fabric is viewed from an outside.

2. The airbag housing apparatus for the vehicle of claim 1, wherein the main body further includes a fixing member and a coupling member,
    wherein the fixing member is provided inside the main body to fix the airbag to the main body, and
    wherein the coupling member is provided outside the main body to be coupled with the fixing member.

3. The airbag housing apparatus for the vehicle of claim 1, wherein the fabric has a net shape getting tangled in a form of a lattice.

4. The airbag housing apparatus for the vehicle of claim 1, wherein a plurality of peeling prevention holes having a preset size to prevent peeling of the fabric is formed in a part of the fabric to which a tension force is applied by opening of the airbag door.

5. The airbag housing apparatus for the vehicle of claim 1, wherein the door portion includes:
   a support portion coupled with a circumference of the end of the main body while enclosing the circumference of the end of the main body and serving as a pillar of the door portion; and
   a housing roof closing an upper side of the support portion, wherein the airbag door is provided at the housing roof.

6. The airbag housing apparatus for the vehicle of claim 5, wherein the airbag door includes a first end and a second end, and
   wherein the first end in the airbag door is separated from the housing roof while the airbag door rotates based on the second end and is open so that the airbag is expanded and spreads outward.

7. The airbag housing apparatus for the vehicle of claim 6, wherein the first end of the airbag door is the stiffness portion and the second end of the airbag door is the ductile portion, based on a boundary portion in which the stiffness portion and the ductile portion are combined with each other.

8. The airbag housing apparatus for the vehicle of claim 5, wherein a hook is provided at a circumference of the end of the main body,
   wherein a hook locking hole is formed in the support portion and the hook is locked with the hook locking hole, and
   wherein the circumference of the end of the main body is inserted into an inner side of the support portion by elastic transformation of the support portion of a ductile portion side.

9. The airbag housing apparatus for the vehicle of claim 8, wherein a slit is formed at the support portion of the ductile portion side so that the elastic transformation of the support portion is performed.

10. The airbag housing apparatus for the vehicle of claim 5, wherein the door portion including the support portion, the housing roof, and the airbag door is integrally formed.

11. The airbag housing apparatus for the vehicle of claim 1, wherein the door portion is provided by injection-molding which injects a stiff material forming the stiffness portion and a ductile material forming the ductile portion inside a mold.

12. The airbag housing apparatus for the vehicle of claim 11, wherein the stiff material is combined with the ductile material by simultaneous injection of the stiff material and the ductile material.

13. The airbag housing apparatus for the vehicle of claim 11, wherein the stiff material and the ductile material are injected into the mold in a state that a fabric of a fabric material is disposed over formation parts of the stiffness portion and the ductile portion of the airbag door.

14. The airbag housing apparatus for the vehicle of claim 13, wherein a jig pin for temporarily fixing the fabric is provided in the mold so that the fabric is prevented from being pulled by injection of the stiff material and the ductile material.

15. A method of manufacturing an airbag housing apparatus for the vehicle for injection-molding the door portion of claim 1, the method including:
   preparing a ductile material and a stiff material constituting the door portion and a mold;
   inserting a fabric of a fabric material into the mold; and
   simultaneously injecting the ductile material and the stiff material into the mold.

16. The method of claim 15, further including;
   fixing the fabric to the mold; and
   releasing the fixing of the fabric.

17. The method of claim 16, wherein the fabric is fixed by a jig pin, and the jig pin is pulled outward by the injected ductile material and stiff material to release the fixing of the fabric.

* * * * *